Patented Mar. 6, 1923.

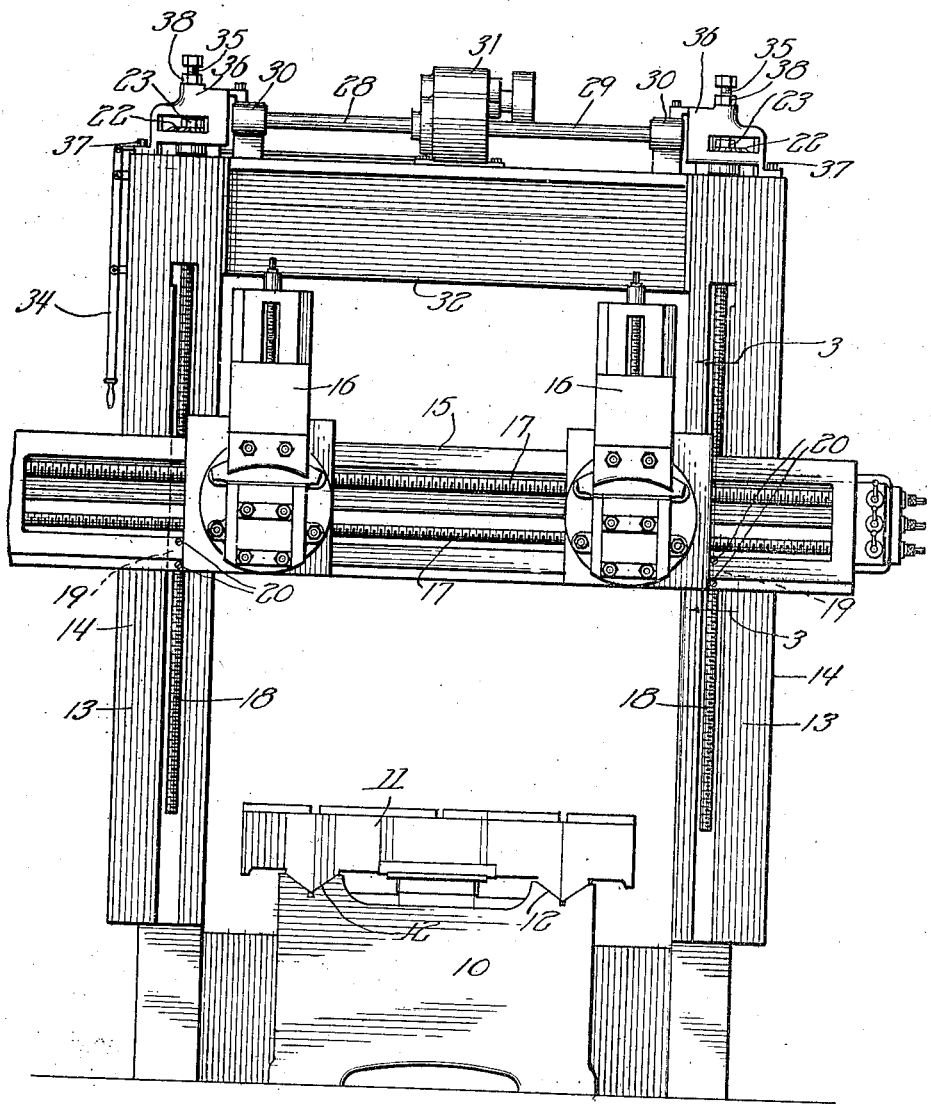

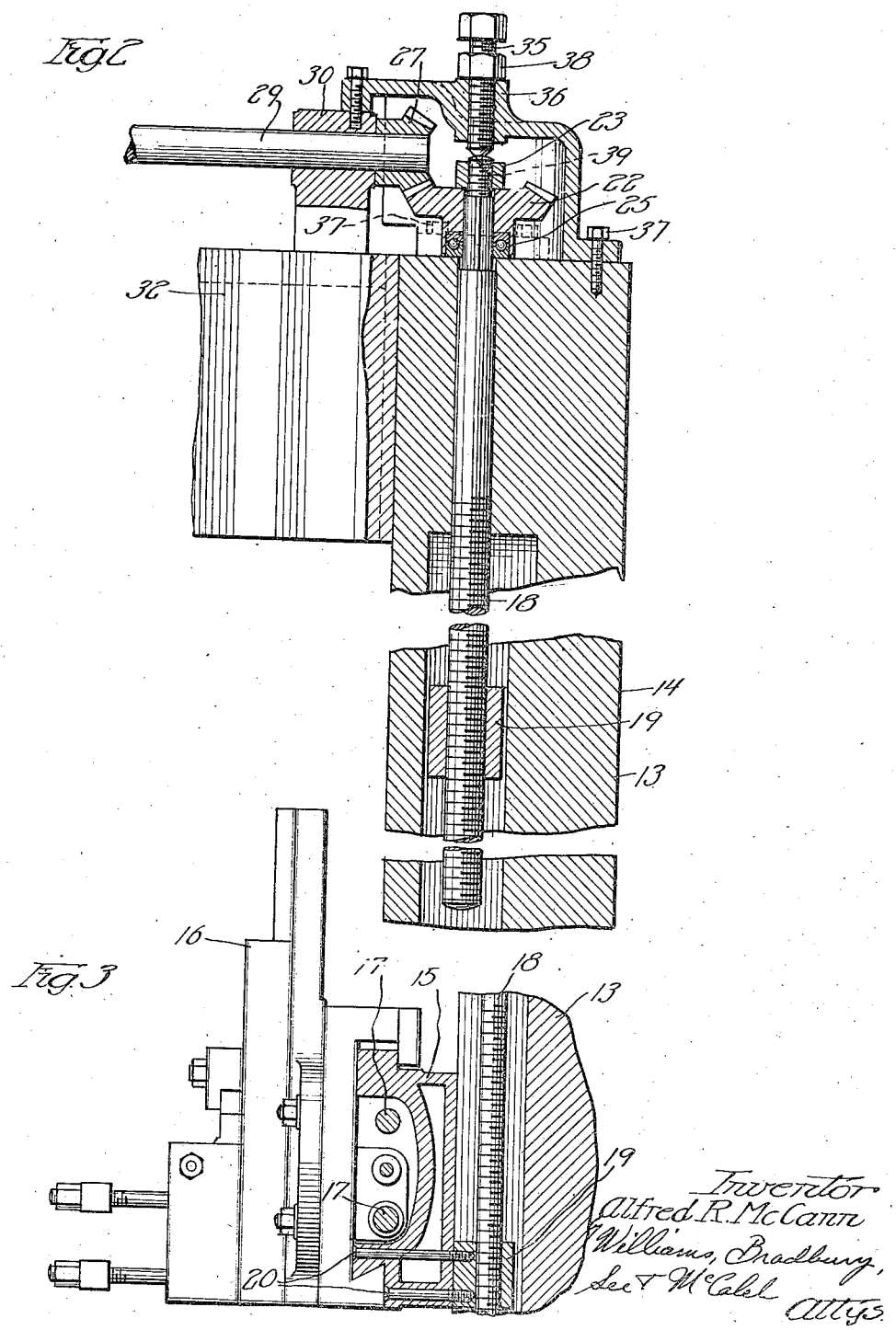

1,447,422

UNITED STATES PATENT OFFICE.

ALFRED R. McCANN, OF HAMILTON, OHIO, ASSIGNOR TO THE LIBERTY MACHINE TOOL CO., OF HAMILTON, OHIO, A CORPORATION OF OHIO.

PLANER.

Application filed April 20, 1921. Serial No. 462,997.

*To all whom it may concern:*

Be it known that I, ALFRED R. McCANN, a citizen of the United States, and resident of Hamilton, in the county of Butler and State of Ohio, have invented a certain new and useful Improvement in Planers, of which the following is a full, clear, concise, and exact description, reference being had to the accompanying drawings, forming a part of this specification.

My invention relates to planers and more particularly to the operating mechanism for the cross rails of the planers.

The cross rails of planers, boring machines and the like carry the cutting tools and are slidably journaled in the frame of the machine so that the operator may adjust the tools relatively to the work carried by the table or platen of the machine. The means for adjusting the cross rail and its associated tools relatively to the work comprises a pair of elevating screws which coact with nut members secured to the cross rail. The elevating screws are adapted to be rotated in unison and when so rotated will displace the cross rail and bring it into any desired position relative to the table.

The objects of my invention are:

First: To provide anti-frictional means for receiving the end thrust of the elevating screws of a planer or the like.

Second: To provide anti-frictional means for receiving the end thrust of the elevating screws of the planer or the like, the machine having means for adjusting the elevating screws along their respective axes.

Third: To provide end thrust bearings for the elevating screws of a planer or the like, the end thrust bearings comprising a set screw for each elevating screw, each set screw being adapted to bear against one end of its associated elevating screw and to coact with the machine to prevent longitudinal displacement of the elevating screw.

Fourth: To provide means for aligning the cross rail of a planer, and means for locking the elevating screws against longitudinal displacement when the cross rail has been properly aligned.

These and other objects of my invention will be more clearly pointed out as the following description progresses, reference being had to the following drawings, wherein—

Figure 1 is an end elevation of a planer embodying the novel features of my invention.

Figure 2 is a transverse vertical section through a housing of the planer looking in the same direction as in Figure 1, and Figure 3 is a section taken on line 3—3 of Figure 1, looking in the direction of the arrows.

Similar characters of reference refer to similar parts throughout the several views.

In Figure 1, the reference character 10 designates the bed of a common type of planer. A platen or table 11 is adapted to be reciprocated upon the bed 10, a pair of ways 12—12 being provided to guide the table. The work upon which machine operations are to be performed is secured to the table by any suitable means. The usual housings are indicated at 13—13 and are provided with ways 14—14 to guide the usual cross rail 15, when it is moved towards or away from the table 11. It is of course understood by those skilled in the art that the cross rail 15 is adapted to carry the tool or tools with which any specific operation is to be performed. For this purpose, cross rail heads 16—16 are provided which are capable of being transversely disposed relatively to the machine by means comprising cross feed screws 17—17. The tools are secured to the cross rail heads in the usual manner, and may be adjusted in a plurality of positions relative to the work resting upon the table 11. To raise and lower the cross rail, a pair of elevating screws 18—18 are provided, one of the elevating screws being rotatably journaled in the upper end of each of the housings 13—13 as shown in Figure 2. The elevating screws co-operate with nuts 19—19 rigidly secured to the rear side of the cross rail 15 by suitable screws 20. It is apparent that the cross rail is suspended in the planer by the elevating screws.

Splined to the upper end of each elevating screw is one of a pair of bevel gears 22—22. Each bevel gear is interposed between its associated housing 13 and a nut 23 threaded upon its associated elevating screw. End thrust ball bearings 25—25 are interposed between the hubs of the bevel gears 22—22 and housings 13—13.

Referring to Figure 2, it will be noted that the weight of the cross-rail suspended by means of the elevating screws normally subjects the elevating screws to tensional strains and that the weight is borne by the ball bearings 25—25, the elevating screws being prevented from slipping out of the ball bearings 25—25 by the gears 22—22 and the nuts 23—23.

It is readily understood that each elevating screw may be longitudinally displaced independently of the other by tightening or loosening its associated adjusting nut 23.

Means are provided for rotating the elevating screws in unison, as when they are so rotated they will move the cross rail upwardly or downwardly, the direction of such movement depending upon the direction in which the elevating screws are rotated.

The means for rotating the elevating screws comprises a pair of bevel gears 27—27, each of which meshes with one of the bevel gears 22—22 and each of which is rigidly secured upon one of the shafts 28 and 29. The shafts 28 and 29 are journaled at their outer ends in bearings 30—30, the inner ends of the shafts being journaled in a casing 31 resting upon a top brace 32 which is interposed between the housings 13—13. The casing 31 contains the usual suitable gearing, and a clutch (not shown) for imparting rotation to the shafts 28 and 29, a pulley being provided whereby the gearing and clutch in the casing may be driven from any suitable source of power. A lever 34 controls the clutch and may be used by the operator whenever it is desired to raise or lower the cross-rail.

As hereinbefore set forth, the elevating screws 18—18 are normally under tension. However, during the cutting stroke of the machine and when the cross-rail is lowered against an obstruction, as, for instance, a piece of work secured to the table 11, the elevating screws will be under compression. To prevent displacement in an upward direction of the elevating screws and to receive the end thrust of the elevating screws when they are under compression, I provide a set screw 35 for each elevating screw. Each set screw 35 is adapted to contact the upper end of its associated elevating screw 18 and is disposed coaxially therewith. Each of the set screws is threaded into one of a pair of brackets 36—36 which are secured rigidly to the housings 13—13 by bolts 37. A lock nut 38 is provided for each set screw 35, the lock nut being interposed between the associated bracket and the head of the set screw.

In the operation of the device, the cross-rail 15 may be raised or lowered by the aforedescribed mechanism which is controlled by the lever 34. If for any reason the elevating screws are placed under compression, the set screws 35 will receive the resulting end thrust and will prevent longitudinal displacement of either or both of the elevating screws.

In assembling the machine, or whenever it becomes necessary, the cross-rail may be aligned with the upper surface of the table. This is preferably done by loosening the lock nut 38 of the set screw 35 associated with the elevating screw 18 which supports the lower end of the cross-rail. The set screw 35 is then withdrawn from engagement with the elevating screw. By tightening the nut 23, the elevating screw may be drawn upwardly until it is raised sufficiently to position the cross-rail parallel to the top surface of the table. The set screw 35 is again brought into engagement with the elevating screw, and secured in this position by the lock nut 38. The planer will then be in an operative condition.

While I have thus described the details of one form of my invention, it is to be understood that I am not limited to these details except by the scope of the appended claims.

What I claim is:

1. In a machine tool comprising a frame, the combination with a tool support slidably journaled in the frame, of a pair of rods rotatably journaled in the frame, means for rotating the rods in unison, the rods being adapted to displace the tool support when so rotated, means for displacing each rod along its axis relatively to the other rod, and an adjustable end thrust bearing at one end of each rod, the bearing comprising means co-acting with the frame for locking the rod in its adjusted position.

2. In a machine tool comprising a frame, the combination with a tool support slidably journaled in the frame, of a pair of rods rotatably journaled in the frame, the rods being disposed parallel to one another, and being threaded into the tool support, means for rotating the rods in unison, means for longitudinally displacing each rod relatively to the other, and a bearing member for each rod adjustably secured in the frame of the machine, the bearing member being adapted to receive the end thrust of the rod when it is in compression and to lock the rod in a plurality of adjusted positions.

3. In a machine tool comprising a frame, the combination with a tool holder slidably journaled in the frame, of a rod rotatably journaled in the frame, the rod being threaded into the tool holder, and adapted to displace the tool holder when rotated, means for longitudinally displacing the rod relatively to its rotary bearing, and a bearing member adjustably secured to the frame, the bearing member being adapted to receive the end thrust of the rod when it is in compression and to lock the rod against longitudinal displacement.

4. In a machine tool comprising a frame, the combination with a tool holder of a pair of rods rotatably journaled in the frame, means for rotating the rods in unison, the rods being adapted to displace the tool holder when so rotated, means for longitudinally displacing one of the rods relatively to the other, and a bearing member adjustably secured to the frame for the adjustable rod, the bearing member being adapted to receive the end thrust of the adjustable rod when that rod is in compression and to lock it against longitudinal displacement.

5. In a planer or the like comprising a frame, the combination with a cross rail slidably journaled in the frame, of a pair of rods rotatably journaled in the frame, means for rotating the rods in unison, the rods being adapted to displace the cross rail when so rotated, means for longitudinally displacing each rod relatively to the other, and means for locking the rods in their adjusted positions, the latter means comprising a bearing member adjustably secured in the frame.

6. In a planer comprising a frame having housings, the combination with a cross rail slidably mounted upon the housings, of a pair of elevating screws rotatably journaled in the housings, means for rotating the elevating screws in unison, the elevating screws being adapted to displace the cross rail when so rotated, means for longitudinally adjusting the elevating screws relatively to each other, and an end thrust bearing member for each elevating screw, the bearing member being adjustably secured to the frame and adapted to lock its associated elevating screw in a plurality of adjusted positions.

7. The combination in a planer or the like comprising a frame, of a cross rail, a plurality of elevating screws for displacing the cross rail, means for longitudinally displacing each elevating screw relatively to the other, and an end thrust bearing member for each elevating screw, the bearing member being adjustably secured in the frame, and adapted to lock the elevating screw in its adjusted position.

8. The combination in a planer or the like comprising a frame, of a pair of elevating screws for displacing the cross rail, and an end thrust bearing member threaded into the frame for receiving the end thrust of one of the elevating screws, the bearing member being adapted to contact the end of its associated elevating screw.

In witness whereof, I hereunto subscribe my name this first day of April, 1921.

ALFRED R. McCANN.

Witnesses:
ALBERT CUTZWIG,
HARRY H. SCHUSTER.